United States Patent [19]
Venanzetti

[11] 3,827,159
[45] Aug. 6, 1974

[54] PARTICULATE MATERIAL CONVEYOR

[75] Inventor: Michele Venanzetti, Milan, Italy

[73] Assignee: Venanzetti Vibrazioni S.p.A., Milan, Italy

[22] Filed: Feb. 26, 1973

[21] Appl. No.: 335,806

[30] Foreign Application Priority Data
Aug. 4, 1972   Italy .................................. 69559/72

[52] U.S. Cl.................... 34/164, 165/120, 432/134
[51] Int. Cl........................................... F26b 11/18
[58] Field of Search ........ 165/120; 432/134; 34/164

[56] References Cited
UNITED STATES PATENTS
2,094,786   10/1937   Flint ...................................... 34/164
2,230,833   2/1941    Douglass .............................. 432/134
3,254,428   6/1966    Bates ..................................... 34/164

Primary Examiner—Charles J. Myhre
Assistant Examiner—Theophil W. Streule, Jr.

[57] ABSTRACT

A conveyor device which is particularly suitable for conveying hot particulate material such as agglomerate for feeding blast furnaces is disclosed. The conveyor is formed with a construction using only bolted connections which nevertheless permits all the necessary degrees of freedom for thermal expansion and contraction without being subject to excessive stresses which might cause fractures. The conveyor comprises a shaker frame having a trough in which the bottom is formed of a plurality of plates in a stepwise array, one end of the shaker frame being higher than the other. The transverse edge of each plate is secured to a respective supporting cross piece and the opposite edge is carried by at least one cranked bracket mounted on the next lower cross piece to which one edge of the adjacent plate is mounted. This arrangement forms a number of openings in the bottom of the trough, and through these openings air can be passed from below to cool the material being conveyed and the plates of the conveyor.

1 Claim, 5 Drawing Figures 3,827,159

PARTICULATE MATERIAL CONVEYOR

BACKGROUND OF THE INVENTION

The present invention relates to a device for conveying particulate material, and particularly to a device for conveying and sieving hot material such as agglomerate material for feeding blast furnaces.

In the case of blast furnaces, the agglomerate material is made by sintering iron flux lime and coke in long continuous mineral furnaces; at the output from the sintering furnaces the material is conveyed to its destination by means of shakers which act as sieves which screen off the pieces which form the agglomerate.

Known systems for conveying and sieving such material comprise at least one shaker frame having at the top a trough the bottom of which comprises a series of plates arranged in steps. Because of the very high temperature of the material to be conveyed (of the order of 1,000°C), fixing of the plates which make up the bottom of the trough to the shaker frame is usually effected by means of bolts and additionally by means of wedges or shims which, owing to the vibrations and to the changes in temperature, often work loose and have then to be tightened up. This makes frequent maintenance necessary.

OBJECT OF THE INVENTION

The object of the present invention is to provide a device for conveying and sieving hot particulate material, which does not suffer from this disadvantage, in which the bottom plates on which the conveyed material travels are fixed securely to the shaker frame without the need for constant tightening of slack elements and without the risk of the formation of dangerous stresses caused by thermal expansion. One feature of embodiments of the invention is that they can be formed of simple and sturdy construction and can be hard wearing.

SUMMARY OF THE INVENTION

According to the invention a conveyor device for conveying and sieving particulate material, such as agglomerate material for feeding blast furnaces comprises in combination, a shaker frame incorporating a trough the floor of which is formed of a series of substantially parallel plates which are inclined with respect to the longitudinal axis of the device, the plates being supported by cross pieces of the frame in such a way as to form transverse openings between adjacent plates, there being a plurality of openings in the sides of the frame between adjacent cross pieces, the openings communicating, by means of tubes with a source of air under pressure.

Various other features and advantages of the invention will become apparent during the course of the following description, given purely by way of example, with reference to the accompanying drawings.

DESCRIPTION OF THE PREFERRED EMBODIMENTS

Figure 2:
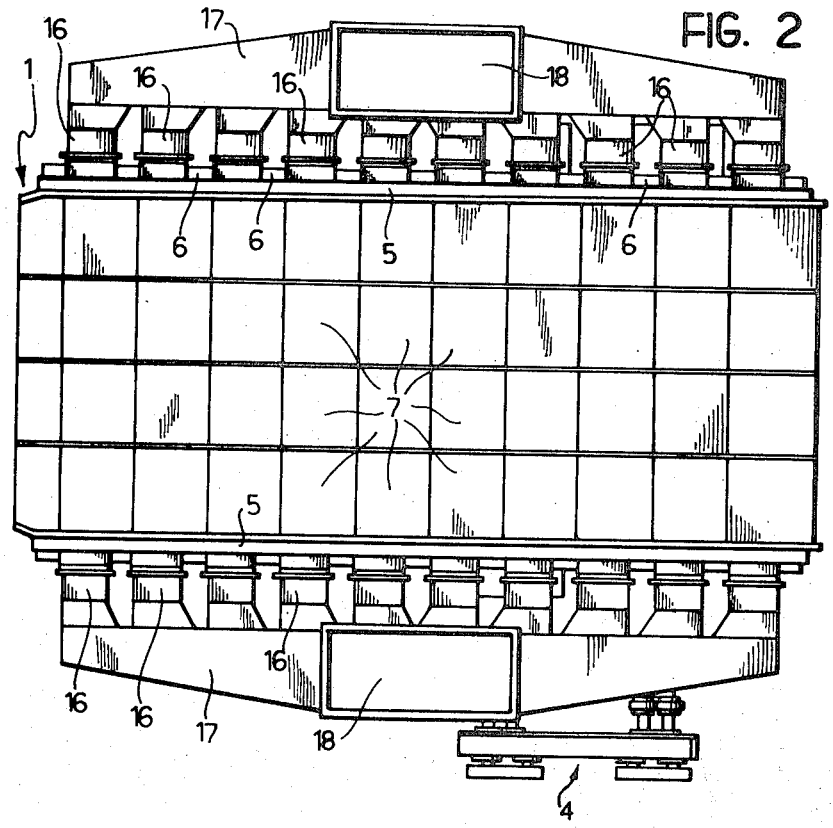
FIG. 2 is a diagrammatic plan view of the embodiment illustrated in FIG. 1.
Figure 1:
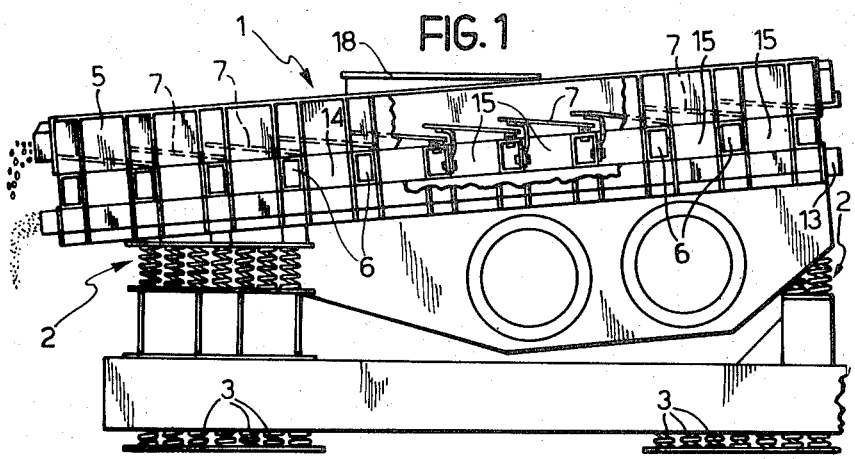
FIG. 1 is a diagrammatic side view of a device formed as an embodiment of the invention.
Figure 3:
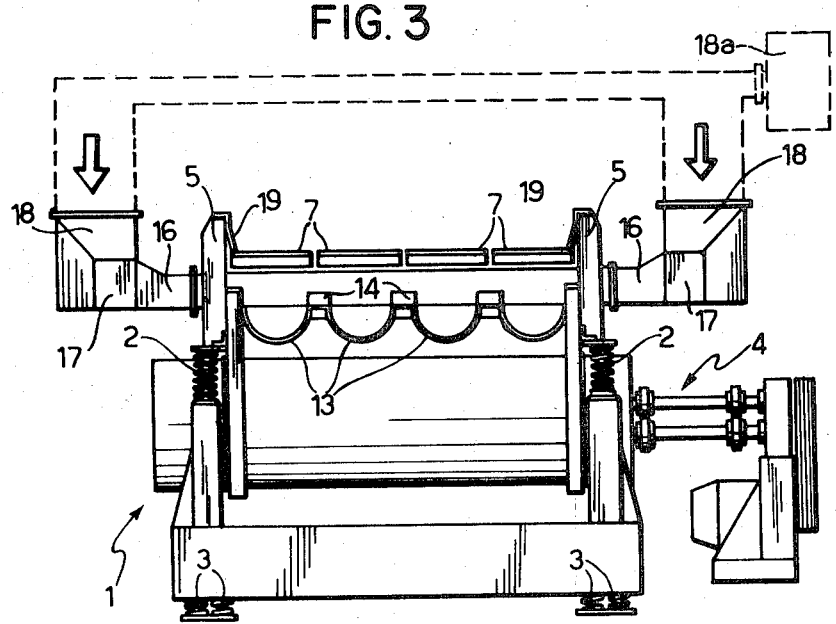
FIG. 3 is a front view of the embodiment illustrated in FIG. 1.
Figure 4:
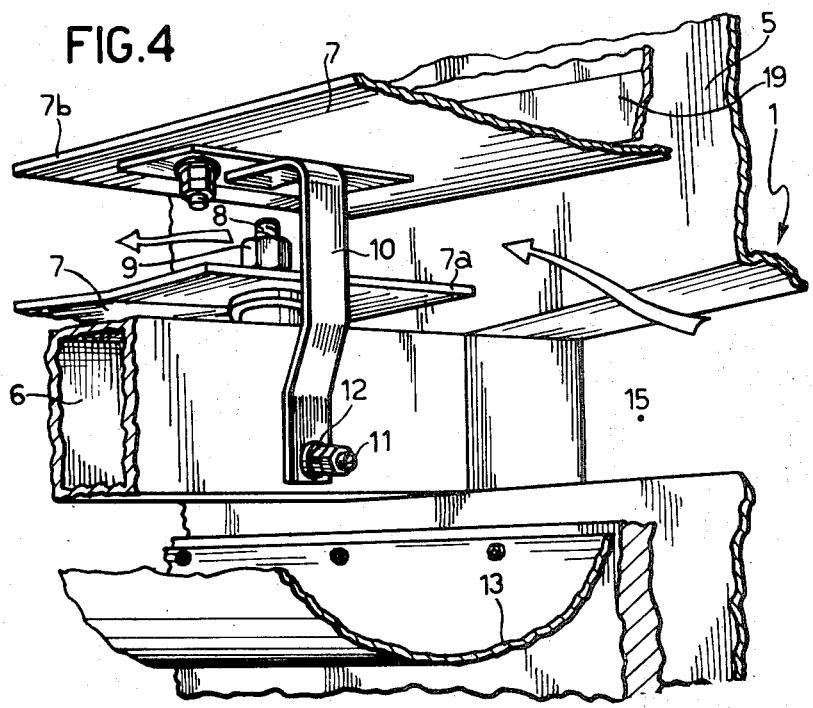
FIG. 4 is a partial perspective view, on an enlarged scale, of a part of the embodiment.
Figure 5:
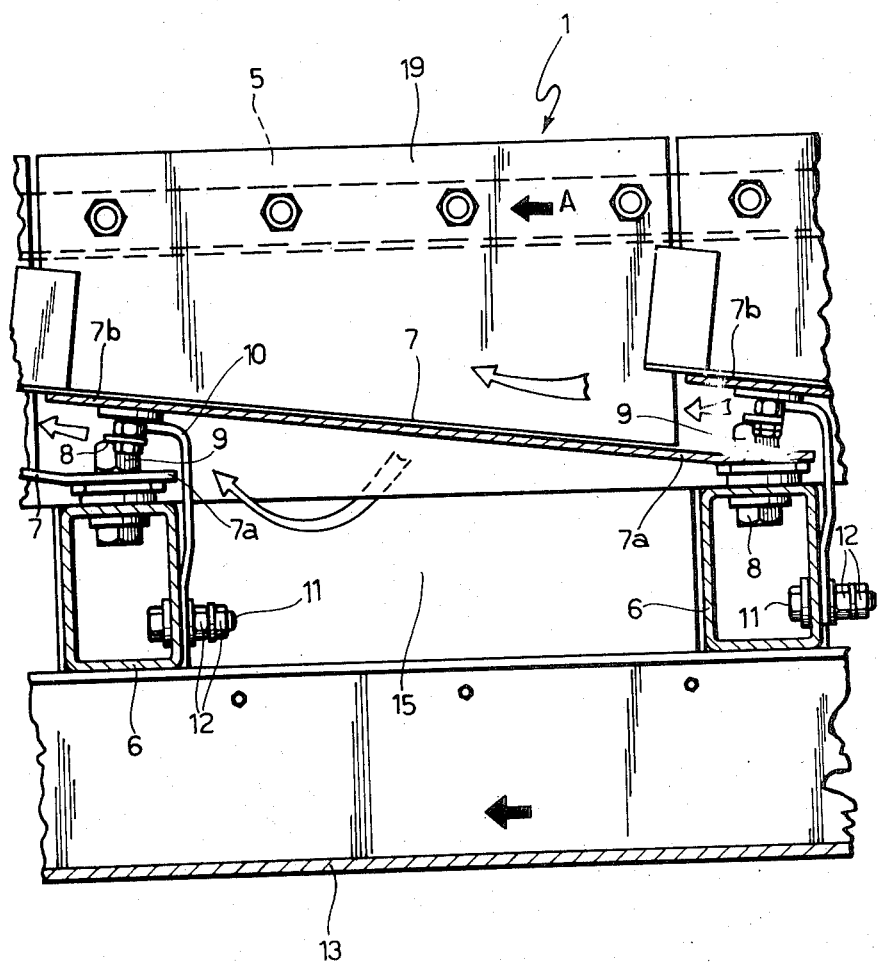
FIG. 5 is a longitudinal section of the part of the embodiment illustrated in FIG. 4.

The embodiment illustrated is particularly suited for conveying and sieving blast furnace agglomerate material, and includes a shaker frame 1, supported on groups of springs 2 and 3 and having, located at one side, a shaker device 4 which operates to cause the shaking action of the shaker frame. In dependence on the overall dimensions of the system, a suitable number of frames of the type shown in FIG. 1 are used, placed end to end so as to form a continuous path over which the material travels by being passed from one frame to the other and so on.

Each frame comprises essentially two strong side stanchions 5, placed vertically, and a number of horizontal cross pieces 6; to the cross pieces there are fixed a number of inclined plates 7, which may be formed with a plurality of apertures, so arranged as to form steps and to constitute the bottom of an upper trough of the frame. The sides of the upper trough are reinforced by inserted plates 19. Each of the bottom plates 7 is inclined in the opposite direction to the general inclination of the sides 5 and is fixed with its lower end 7a to the cross piece 6 immediately below it, whilst the other end 7b is carried above the cross piece on which the lower end 7a of the adjacent plate is mounted, thus forming a gap between adjacent plates extending across the frame and through which the very small particles can pass while the large particles are conveyed in the opposite direction.

The higher end 7b of each plate is supported by at least one cranked flexible 10 which is secured to the lower face of the plate and is bolted, by means of a bolt 11 and nuts 12, to the crosspiece 6 immediately below. On the other hand the lower end 7a of each plate is fixed directly to the cross piece 6 by means of a bolt 8 and nuts 9.

The cranked brackets 10 serve a double purpose, that is they support the higher end of the plate to form a step, and they also allow movement of the plate due to thermal expansion to take place, the bracket flexing if these occur longitudinally and rotating about the bolt 11 if these occur in a direction transverse to the general path of the material on the conveyor 1.

On the sides 5 there are formed wide apertures 15 located opposite each other and extending between adjacent cross pieces 6. To these lead outside pipes which, in the example illustrated, consist of hoses 16 connected by manifolds 17 leading to feed pipes 18. These pipes are fed, by one or more blowers 18a, with cool air under pressure, which passes below the trough conveying the material and emerges from the openings between adjacent plates 7, thereby cooling the bolts which hold the plates to the shaker frame, and also partially cooling the material on the conveyor which the air flows past.

This cooling arrangement allows assembly of the parts by means of bolts which can be fully tightened, thus eliminating connection by means of wedges, shims or the like.

The partial cooling of the material being conveyed may be of the order of 300°C, in the case of blast furnace agglomerate material, and this makes it possible to reduce the dimensions, the load and the power of successive cooling systems.

Below the plates 7 there are located further shaped troughs 13 which are supported by longitudinal members 14. The troughs 13 act as ducts for the air, and also act to collect the very small particles which fall through between the plates 7; the troughs 13 extend longitudinally over the whole length of the frame 1. In a system which has a large number of frames arranged in series, the troughs 13 of adjacent frames fit into one another to form a continuous trough.

Naturally, the principle of the invention remains the same, while the forms in which it is put into effect and the details of construction may be widely varied without departing from the spirit and scope of the invention.

What is claimed is:

1. A device for conveying particulate material comprising, in combination:
   a shaker frame,
   means defining a trough on said shaker frame, said trough comprising side walls and a bottom and being open at each end,
   a plurality of plates defining said bottom of said trough, each said plate being inclined to the general line of said bottom in a step-wise array from one end to the other of said trough, and having leading and trailing edges respectively facing said one end and said other end of said trough,
   means supporting said leading and trailing edges of said plates, said supporting means holding the trailing edge of each plate above the leading edge of the adjacent plate such that said edges define transverse openings in the bottom of said trough,
   a plurality of cross members forming part of said supporting means for said plates extending between the side walls of said trough below said plates, said leading edge of each plate being bolted directly to the associated one of said cross members,
   cranked brackets connecting each of said trailing edges of said plates to associated ones of said cross members, each of said cranked brackets being bolted by means of a single bolt to the cross member to which the leading edge of the adjacent said plate is bolted, said single bolt extending substantially parallel to the axis of said trough and permitting small angular movements of said plate which may be induced by thermal expansion when said conveyor device is carrying a hot material, said brackets being capable of flexing to allow expansion and contraction of said plates,
   means defining a plurality of openings in the side walls of said shaker frame below said trough and between the leading and trailing edges of at least some of said plates, and
   means connecting said openings to a source of air under pressure.

* * * * *